July 24, 1956 G. W. REED 2,755,947
HAY STACKING DEVICE AND UNLOADER

Filed Aug. 9, 1954 3 Sheets-Sheet 1

INVENTOR
Gilbert W. Reed
By Fetherstonhaugh
HIS ATTY'S

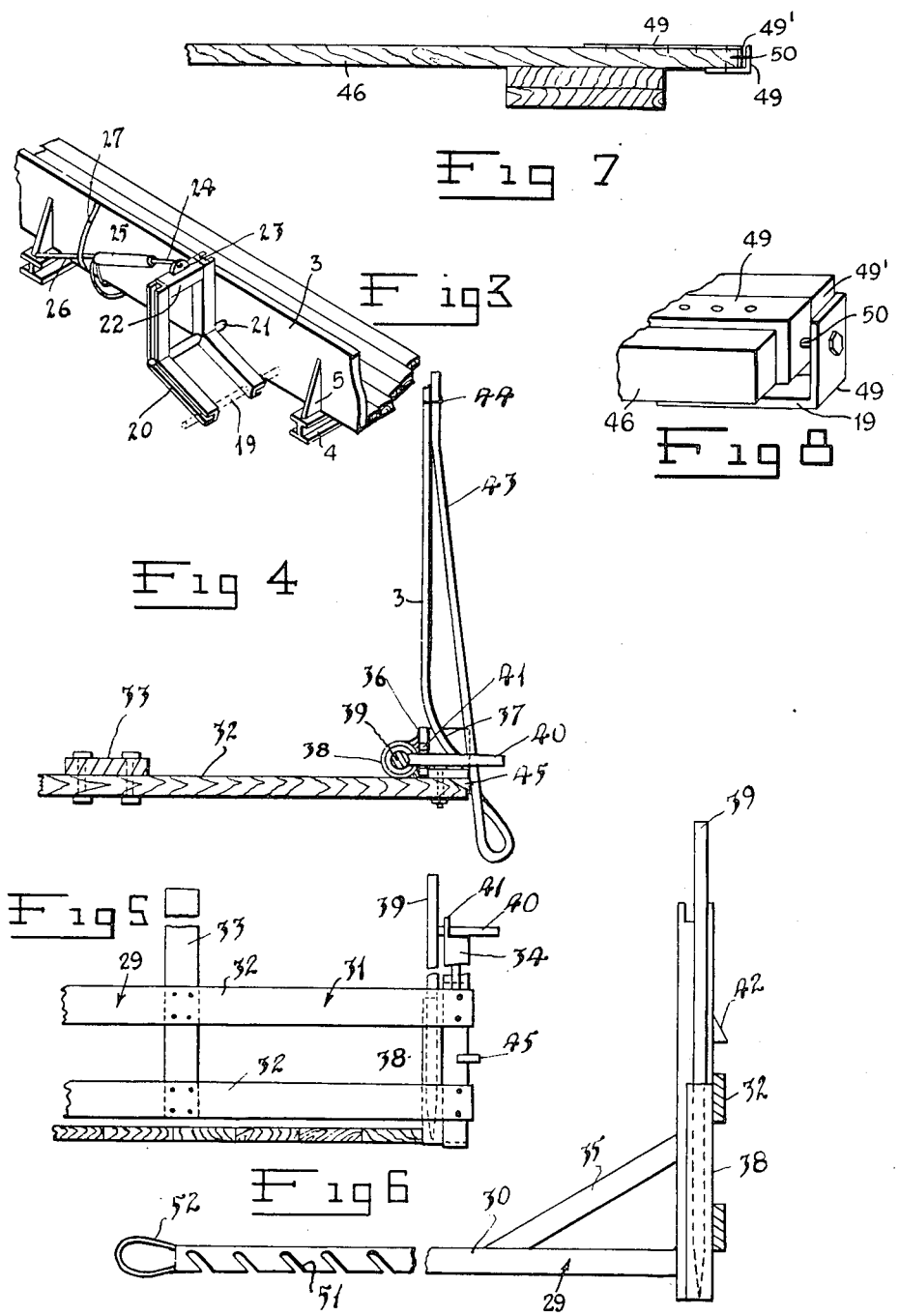

July 24, 1956  G. W. REED  2,755,947
HAY STACKING DEVICE AND UNLOADER
Filed Aug. 9, 1954  3 Sheets-Sheet 3

INVENTOR
GILBERT W. REED

Fetherstonhaugh + Kent.

PATENT ATTORNEYS

United States Patent Office 2,755,947
Patented July 24, 1956

2,755,947

HAY STACKING DEVICE AND UNLOADER

Gilbert W. Reed, Leacross, Saskatchewan, Canada

Application August 9, 1954, Serial No. 448,668

7 Claims. (Cl. 214—353)

My invention relates to new and useful improvements in hay stacking devices and unloaders therefor, the principal object and essence of my invention being to provide a carrier upon which bales of hay may be stacked manually, the rear end of said carrier then being allowed to engage the ground whereupon an loading assembly within said carrier may be engaged with the ground to anchor same so that when the carrier is then moved forwardly, the load, together with the unloading assembly, is deposited upon the ground, the load maintaining its stacked position.

A further object of my invention is to provide a device of the character herewithin described which permits two operators to bale and stack hay rapidly and economically and accomplish approximately the same amount of work normally requiring five or six operators.

A yet further object of my invention is to provide a device of the character herewithin described wherein the unloading assembly can readily be disengaged from the stack and replaced upon the carrier.

A further object of my invention is to provide a device of the character herewithin described which is simple in construction, economical in operation, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 3 is a fragmentary perspective view of one side of the carrier showing details of the rear wheel mounting, and hydraulic system.

Figure 4 is a fragmentary top plan view of my unloading assembly.

Figure 5 is a fragmentary rear end elevation of my unloading assembly.

Figure 6 is a side elevation of my unloading assembly.

Figure 7 is a rear view of my unloading bar per se.

Figure 8 is an enlarged fragmentary perspective view of the right-hand end of Figure 7.

In the drawings like characters of reference indicate corresponding parts in the different figures.

Figure 1:
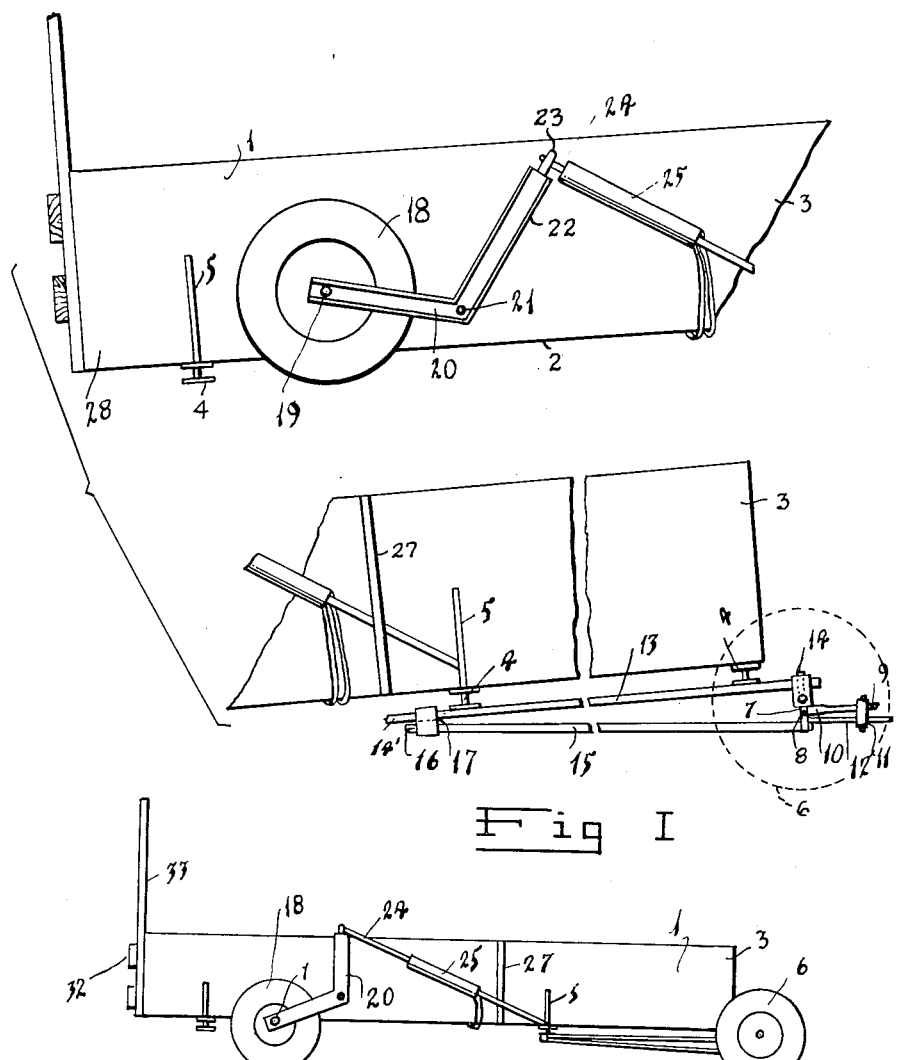
Figure 1 is a side elevation of my device showing the rear end in engagement with the ground.

Briefly, my device is designed to be used in association with a hay baling device, said hay baling device being drawn behind a tractor. My device is adapted to be drawn behind the hay baler, thus constituting a complete baling and stacking unit, which can be operated by two men, one driving the tractor and the other operating the stacking device. However, in the accompanying drawings, neither the tractor nor the hay baler device have been shown, as these are conventional, but it should be appreciated that the tractor is adapted to supply a source of hydraulic power to the hydraulic cylinders, the function of which will hereinafter become apparent.

My device consists of a substantially box-like carrier 1 including a substantially rectangular floor 2 and a pair of upstanding longitudinally extending sides 3. In this connection, cross-members 4 pass underneath the floor 2 and the sides 3 are braced to these cross-members by means of webs 5 welded thereto.

A pair of steerable ground-engaging front wheels 6 are provided mounted upon a front axle beam 7 by means of conventional pivoted stub axles 8. A draft tongue 9 is secured by a double clevis 10 to the front of the axle beam 7 and extends forwardly to be connected to the hay baler (not illustrated). This tongue is also pivotally connected forwardly of the clevis 10 to a transverse steering rod 11, which in turn is pivotally connected to a pair of steering arms 12 extending to the pivoted stub axles in the usual way, thus ensuring that lateral movement of the tongue also moves the wheels 6 in the same direction.

A draft rod 13 is secured by means of a sleeve and bolt 14 to the centre of the axle beam 7 and extends rearwardly and is secured as by welding to the underside of the first two cross-members 4 of the carrier, it being observed that the rear end 14' of this draft rod extends rearwardly of the second cross-member 4.

A pair of radius rods 15 (only one of which is shown) are secured to the underside of the axle beam 7 in spaced relation and extend rearwardly to converge to a common apex 16, at which point a sleeve 17 is welded. This sleeve 17 also extends around the rear extension 14 of the draft rod 13 and permits slight movement to occur between the radius rods and the draft rod, and assist in maintaining the vertical axis of the front axle in position against the pull of the tractor.

The rear ground engaging wheels 18 are situated one upon each side of the carrier adjacent the rear end thereof, each rear wheel being supported for rotation upon an axle 19, which in turn is supported within a cradle collectively designated 20. This cradle, which is angulated as illustrated in Figure 3, is supported for rotation upon a shaft 21 extending from the side of the carrier 1 and it will be seen that this cradle is manufactured from channel iron for strength and rigidity. The upper end 22 of the cradle is provided with a clevis 23, to which is pivotally connected the piston rod 24 of an hydraulic piston and cylinder assembly 25. These cylinder assemblies are anchored at the rear end thereof to a bar 26, which in turn is secured to the sides 3 of the carrier, a brace 27 maintaining the forward end of this bar in the required spaced relationship from the side of the carrier, as clearly shown.

Figure 2:
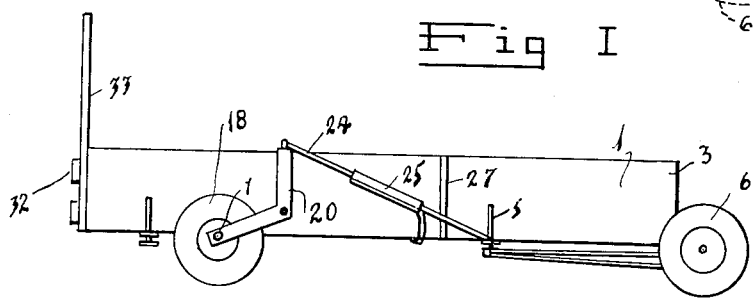
Figure 2 is a view similar to Figure 1, but showing the rear end raised from the ground.
Figure 9:
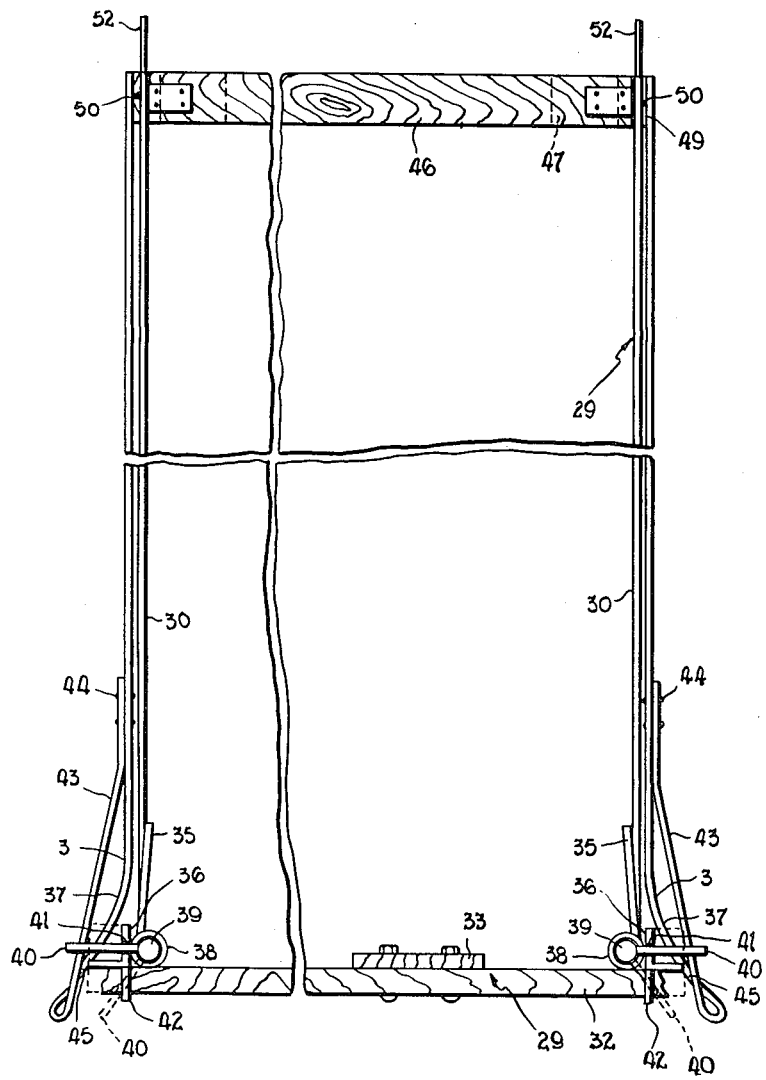
Figure 9 is a top plan view of my device.

These hydraulic piston and cylinder assemblies are connected by the usual conduits (not illustrated) to the source of hydraulic power upon the tractor (not illustrated) and an inspection of Figures 1 and 2 will show that when the hydraulic piston and cylinder assemblies are extended, as in Figure 2, the cradle takes up the position shown in this drawing, thus maintaining the carrier substantially horizontally relative to the ground.

However, when the hydraulic cylinder and piston assemblies are retracted, as shown in Figure 1, the rear end 28 of the carrier is lowered so that it engages the ground, as clearly shown.

I have provided an unloading assembly collectively designated 29, it being understood that this unloading assembly is selectively detachable from the carrier. This unloading assembly consists basically of a pair of side arms 30 spanned at the rear ends thereof by a tail gate 31, it being understood that the side arms 30 are adapted to lie upon the floor of the carrier, one upon each side thereof, with the tail gate closing the end of the carrier. The tail gate consists of transverse planking members 32 and vertical supports 33 secured to side members 34, the details of which will hereinafter become apparent. The afore-mentioned side arms 30 are also secured to these side members 34 and strengthened by means of diagonal braces 35, as shown in Figure 6.

Means are provided to anchor the rear end of the unloading assembly to the ground when the carrier is in the position shown in Figure 1, so that the carrier can be driven forwardly and from under the unloading assembly. This means takes the form of an angle iron 36 forming said side members and situated (when upon the carrier) adjacent the rear curved ends 37 of the sides 3 thereof. A tubular guide 38 is secured to one flange of these angle irons and an iron stake or rod 39 is adapted to be slidably supported within these tubular guides and reference to Figure 5 will show that the lower ends of these rods are pointed to facilitate engagement thereof within the ground. Means coacting between the angle iron 36 and the rods 39 are adapted to maintain the rods either in the uppermost position, as shown in Figure 5 or in the lowermost position (not illustrated). These means take the form of a handle 40 extending at right angles from adjacent the upper ends of the rods 39, said handle being adapted to engage within lugs 41 upon the upper end of the angle irons 36 when in the uppermost position. However, when it is desired to lower the rods so that the pointed ends depend below the floor of the carrier, and can thus engage the ground, the rod is first lifted so that the handle 40 disengages from the lugs 41 whereupon a slight turn of the rod will permit same to be lowered within the tube 38, the handle 40 engaging under a lug 42 secured to and extending from the angle irons, as clearly shown in Figure 6.

Means are provided to selectively maintain the unloading assembly upon the carrier or to release same as desired, and in this connection, reference should be made to Figures 4 and 5. A resilient lever 43 is secured by rivets 44 to the sides of the carrier upon each side thereof and extend rearwardly therefrom. A lug 45 is secured adjacent the rear ends of these levers, the resiliency of which normally forces the lugs inwardly, so that they engage over the angle iron side members 36 of the unloading assembly, as clearly shown, thus maintaining same secured firmly to the carrier. However, when it is desired to remove the unloading assemblies from the carrier, as will hereinafter be described, these levers are moved outwardly, thus disengaging the lugs from the unloading assembly and permitting same to be withdrawn.

Finally, I have provided a detachable unloading bar 46 which consists of a transverse beam having spacers 47 upon the underside thereof. The ends 48 of this beam are faced with steel and provided with L-shaped members 49 forming a recess 49' and having bolts 50 spanning same as clearly shown in Figure 7. The afore-mentioned arms 30 of the unloading assembly are provided with a plurality of diagonal ratchet slots 51 upon the underside thereof, together with handles 52 upon the forward ends thereof. The unloading beam is adapted to span the floor of the carrier at the desired location therealong, whereupon the arms 30 may be lifted by means of the handle 52 and the desired slots 51 engaged over the bolts 50 spanning the recesses 49' of the unloading bar, thus locking same firmly thereto.

In operation, the unloading assembly is placed within the carrier and secured thereto by means of the levers 43, the unloading assembly being in the position shown in Figure 2.

Bales of hay are moved manually from the baler (not illustrated) and stacked upon the floor of the carrier until the desired load has been stacked, whereupon the unloading bar is placed upon the floor of the carrier against the front edge of the load and the arms 30 engage over the ends thereof, as hereinbefore described. The iron stakes or rods 39 are then disengaged from the lugs 41 and lowered through the tubes 38 so that the points thereof depend below the carrier, the handles 40 being engaged underneath the lugs 42 on the sides 34 of the unloading assembly. This locks the stakes in the lowered position, whereupon the hydraulic piston and cylinder assemblies 25 are actuated so that the rear end 28 of the carrier engages the ground, as shown in Figure 1. The weight of the load during this operation forces the lower ends of the stakes firmly within the ground and anchors the unloading assembly at this point. The resilient levers 43 are now disengaged from the sides 34 of the unloading assembly, whereupon the carrier is driven forwardly by the tractor so that the floor of the carrier slides from beneath the load. It will be appreciated that the load is maintained in the static position by means of the unloading bar spanning the front of the arms of the unloading assembly, so that when the carrier has been driven forward sufficiently, the entire load and the unloading assembly are upon the ground, whereupon the unloading assembly can readily be removed from around the load and replaced within the carrier for a further operation.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A device of the class described for use in association with a source of power and a hay baler; comprising in combination a carrier upon which bales of hay are adapted to be stacked manually, said carrier including a pair of steerable front ground-engaging wheels and a pair of rear ground engaging wheels, hydraulic means coacting between said carrier and said rear wheels adapted to raise and lower selectively the rear end of said carrier with relation to the ground, an unloading assembly in said carrier, said unloading assembly including a pair of side arms adapted to lie one on each side of the interior of said carrier, an end gate spanning the rear ends of said side arms and maintaining same in parallel spaced relationship, a detachable unloading bar adapted to span and engage the forward ends of said side arms selectively along the length thereof, means coacting between said carrier and said unloading assembly adapted selectively to retain or release said unloading assembly to or from said carrier, and means on the rear end of said unloading assembly selectively engageable with the ground whereby said unloading assembly is adapted to be withdrawn from said carrier.

2. The device according to claim 1 in which said carrier consists of a substantially rectangular floor and a pair of longitudinal, parallel sides, said hydraulic means coacting between said carrier and said rear wheels including a cradle for each of said rear wheels, said cradle being angulated and pivotally secured to the sides of said carrier adjacent the point of angulation thereof, a stub shaft for said pivotal attachment extending from the side of said carrier, an hydraulic cylinder and piston assembly secured to each side of said carrier and being pivotally secured by one end thereof to one end of said cradle, said wheel being supported for rotation within the opposite end of said cradle.

3. The device according to claim 1 in which said means coacting between said carrier and said unloading assembly consist of a pair of resilient levers secured by one end thereof to the side of said carrier and extending rearwardly therefrom, means on the opposite end of said levers adapted to engage around the side members of said end gate and maintain said unloading assembly within said carrier, said means being disengageable from said side members against the resiliency of said levers.

4. The device according to claim 1 in which said means on the rear end of said unloading assembly selectively engageable with the ground includes a pair of side members for said end gates, a vertically situated tubular guide secured to each of said side members, a ground engaging stake slidably supported within said guide, means coacting between said stake and said side members to maintain said stake in the raised or lowered position.

5. The device according to claim 1 in which said side arms include a plurality of ratchet slots upon the underside thereof, said unloading bar including a recess formed upon each end thereof, a bolt spanning each of said recesses, said ratchet slots being selectively engageable upon said bolts.

6. The device according to claim 3 in which said means on the rear end of said unloading assembly selectively engageable with the ground includes a pair of side members for said end gates, a vertically situated tubular guide secured to each of said side members, a ground engaging stake slidably supported within said guide, means coacting between said stake and said side members to maintain said stake in the raised or lowered positions.

7. The device according to claim 4 in which said side arms include a plurality of ratchet slots upon the underside thereof, said unloading bar including a recess upon each end thereof, a bolt spanning each of said recesses, said ratchet slots being selectively engageable upon said bolts.

References Cited in the file of this patent

UNITED STATES PATENTS

| | | |
|---|---|---|
| 1,051,748 | Mortenson | Jan. 28, 1913 |
| 1,093,444 | Lewis et al. | Apr. 14, 1914 |
| 1,225,031 | Heiden | May 8, 1917 |
| 1,328,923 | Jasper | Jan. 27, 1920 |
| 2,304,086 | Hagan | Dec. 8, 1942 |
| 2,552,713 | Flower | May 15, 1951 |
| 2,609,953 | Schramm | Sept. 9, 1952 |